(12) United States Patent
Osen et al.

(10) Patent No.: US 11,208,861 B2
(45) Date of Patent: *Dec. 28, 2021

(54) SUBSEA WELLHEAD ASSEMBLY

(71) Applicant: EQUINOR ENERGY AS, Stavanger (NO)

(72) Inventors: Per Osen, Oslo (NO); Morten Sæther, Lillestrom (NO); Lorents Reinås, Stavanger (NO); Harald Sigurd Nesse, Sandnes (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

This patent is subject to a terminal disclaimer.

(21) Appl. No.: 16/783,532

(22) Filed: Feb. 6, 2020

(65) Prior Publication Data
US 2020/0173244 A1    Jun. 4, 2020

Related U.S. Application Data

(63) Continuation of application No. 16/082,676, filed as application No. PCT/NO2017/050061 on Mar. 8, 2017, now Pat. No. 10,753,168.

(30) Foreign Application Priority Data

Mar. 8, 2016   (GB) ..................... 1603998
Dec. 23, 2016  (GB) ..................... 1622128

(51) Int. Cl.
*E21B 33/038*    (2006.01)
*E21B 41/08*     (2006.01)
(Continued)

(52) U.S. Cl.
CPC ............ *E21B 33/038* (2013.01); *E21B 33/03* (2013.01); *E21B 33/0355* (2013.01);
(Continued)

(58) Field of Classification Search
CPC .. F16L 37/002; E21B 33/0355; E21B 33/038; E21B 33/043; E21B 33/064; E21B 33/076

See application file for complete search history.

(56) References Cited

U.S. PATENT DOCUMENTS

| 3,817,325 A | 6/1974 | Mott et al. |
| 4,260,289 A * | 4/1981 | Moinard ............... E21B 33/038 |
| | | 405/169 |

(Continued)

FOREIGN PATENT DOCUMENTS

| GB | 2527386 | 12/2015 |
| WO | 2011/162616 | 12/2011 |
| WO | 2016/085348 | 6/2016 |

OTHER PUBLICATIONS

Pavan Kumar Illendala, Master's Thesis: "Structural Analysis to Determine the Stress Induced Loading on Wellhead Housing System Supported by CAN and Sea Bed BOP Supporter", Faculty of Science and Technology, University of Stavanger, 2012, pp. 1-92.

(Continued)

*Primary Examiner* — James G Sayre
(74) *Attorney, Agent, or Firm* — Wenderoth, Lind & Ponack, L.L.P.

(57) ABSTRACT

A subsea wellhead assembly and a method of installing a subsea well head assembly. The subsea wellhead assembly includes: a conductor; a subsea wellhead; and subsea riser system equipment mounted on the subsea wellhead. The subsea riser system equipment is connected to the conductor such that forces can be transmitted from the subsea riser equipment to the conductor in both tension and compression.

20 Claims, 5 Drawing Sheets

(51) Int. Cl.
*E21B 33/03* (2006.01)
*E21B 33/035* (2006.01)
*E21B 33/043* (2006.01)
*E21B 33/076* (2006.01)
*F16L 37/00* (2006.01)
*E21B 33/064* (2006.01)

(52) U.S. Cl.
CPC .......... *E21B 33/043* (2013.01); *E21B 33/076* (2013.01); *E21B 41/08* (2013.01); *F16L 37/002* (2013.01); *E21B 33/035* (2013.01); *E21B 33/064* (2013.01)

(56) References Cited

U.S. PATENT DOCUMENTS

| | | |
|---|---|---|
| 5,088,556 A | 2/1992 | Short et al. |
| 5,971,076 A | 10/1999 | Taylor et al. |
| 10,753,168 B2 * | 8/2020 | Osen ................... E21B 33/0355 |
| 2013/0105171 A1 | 5/2013 | Strand |
| 2014/0374113 A1 | 12/2014 | Kebadze |
| 2014/0374115 A1 | 12/2014 | Kebadze et al. |
| 2016/0186517 A1 * | 6/2016 | Hopper ................. E21B 33/038 166/359 |

OTHER PUBLICATIONS

International Search Report dated Jun. 2, 2017 in International (PCT) Application No. PCT/NO2017/050061.
Written Opinion of the International Searching Authority dated Jun. 2, 2017 in International (PCT) Application No. PCT/NO2017/050061.
Search Report dated Aug. 30, 2016 in United Kingdom Application No. GB1603988.4.

* cited by examiner

SUBSEA WELLHEAD ASSEMBLY

The invention relates to a subsea wellhead assembly and a method of installing a subsea wellhead assembly. In particular, the present invention is concerned with a subsea wellhead assembly for reducing riser induced loads onto a subsea wellhead. This may be regarded as providing wellhead load relief.

A typical subsea assembly comprises a subsea wellhead (i.e. high pressure wellhead housing) to which subsea riser system equipment, such as a blowout preventer (which may comprise a lower stack and a lower marine riser package (LMRP)) and/or a Christmas tree (which may also be referred to as a subsea tree) may be connected. The subsea riser system equipment is connected (in a downwards direction) to the wellhead and is typically connected (in an upwards direction) to a riser that extends between this riser system equipment and a surface facility, such as a floating vessel. The riser typically provides a conduit for the drill string and drilling fluids between the subsea well and the surface facility.

It is important that the wellhead assembly integrity is maintained so that structural failure and uncontrolled release of well fluids does not occur. As a result, it is desirable that forces that act on the assembly have as low risk as possible of damaging the assembly.

US 2014/0374115 discloses a system for tethering a subsea blowout preventer to the sea bed via a plurality of anchors which are disposed about the subsea BOP and secured to the sea floor. This system can reduce the riser loads on subsea blowout preventers, wellheads and primary conductors and thereby reduce the risk of damage. However this system requires the installation of anchors in the sea floor and is relatively expensive and time consuming to install. Therefore, there is a desire for an alternative and/or improved and/or additional system to provide wellhead load relief.

In a first aspect the present invention provides a subsea wellhead assembly, the assembly comprising: a conductor (i.e. wellhead foundation); a subsea wellhead; and subsea riser system equipment mounted on the subsea wellhead; wherein the subsea riser system equipment is connected to the conductor such that forces can be transmitted from the subsea riser system equipment to the conductor.

In a second aspect, the present invention provides a method of installing a subsea wellhead assembly, the method comprising: providing (e.g. installing) a conductor (i.e. wellhead foundation), a subsea wellhead, and subsea riser system equipment connected to the wellhead; and connecting the subsea riser system equipment to the conductor such that forces can be transmitted from the subsea riser system equipment to the conductor.

Herein the terms wellhead and high pressure wellhead housing may be used interchangeably.

A conductor may comprise a conductor housing. The terms conductor housing, low pressure wellhead housing and wellhead foundation may be used interchangeably.

The subsea riser system equipment may be referred to as subsea pressure equipment or subsea pressure containing/controlling equipment. This may be equipment that is installed/located on the wellhead during production from the wellhead.

The conductor may be a conventional (e.g. well known, traditional) conductor comprising a conductor housing and optionally a number of conductor joints attached thereto (such as by threaded connection). Alternatively, the well assembly may not comprise a traditional conductor. In this case, the loads are transferred into the device that provides the functions of a traditional conductor.

This may be a foundation such as a template or a suction anchor or any other means that provides lateral support to a high pressure wellhead housing.

For example, if the well assembly comprises a suction anchor, the functions of the conductor may be provided by a suction anchor, such as the outer skirt of the suction anchor. Similarly, if the high pressure wellhead housing is supported directly in a template the functions of the conductor may be provided by the template. In this case, the subsea riser system equipment may be connected (directly or indirectly, such as via a wellhead support) to the suction anchor or template (or any other foundation structure) such that at least some (e.g. a significant portion of the) forces are transferred into the suction anchor/template/wellhead foundation without being transmitted through the high pressure wellhead housing.

Whilst the term conductor is used herein to refer to the component to which the forces may be transmitted, the term wellhead foundation may equally be used. As explained above the conductor/wellhead foundation may be a traditional conductor and/or a non-traditional conductor such as the outer suction skirt of a suction anchor.

In other words the present invention may provide a subsea well assembly comprising a high pressure wellhead housing, a low pressure wellhead housing and subsea pressure equipment, wherein the subsea pressure equipment is connected (e.g. fluidly and/or structurally) to the high pressure wellhead housing and connected to the low pressure wellhead housing so that at least some of the loads can be at least partially transmitted from the subsea pressure equipment (e.g. BOP or Christmas tree) to the low pressure wellhead housing without going via (i.e. without passing through or being transferred via) the high pressure wellhead housing.

Also in other words the present invention may provide a method comprising providing a subsea well assembly comprising a high pressure wellhead housing, a low pressure wellhead housing and subsea pressure equipment, wherein the subsea pressure equipment is connected (e.g. fluidly and/or structurally) to the high pressure wellhead housing and connecting the low pressure wellhead housing to the pressure equipment so that loads can be transmitted from the subsea pressure equipment to the low pressure wellhead housing without going via the high pressure wellhead housing.

The subsea pressure equipment may be subsea production equipment. The subsea pressure equipment may be a Christmas tree and/or a blowout preventer (BOP) for example.

The subsea riser system equipment may be at least partially attached or structurally locked/fixed to the high pressure wellhead housing.

With the present invention at least some of the loads from the subsea riser system equipment may be transferred into the high pressure wellhead housing and at least some of the loads may be transferred into the conductor without being transferred through the high pressure wellhead housing. Thus, the loads may be shared between the high pressure wellhead housing and the conductor and the magnitude of the loads being transferred into the high pressure well head housing may be reduced compared to an assembly without the present invention. This may reduce the risk of damage to the high pressure wellhead housing.

The high pressure wellhead housing may be located within the low pressure wellhead housing.

The present invention may provide a system for effective wellhead (i.e. high pressure wellhead) load relief which is relatively easy to install. The assembly may be installed with existing installation tools and/or comprise pre-installed components.

The assembly may comprise components that are retrofit onto existing and/or preinstalled wellhead assemblies. This may permit wellhead load relief to be provided on subsea wellheads that have already been installed.

The present invention may reduce the loading in the wellhead, on which the subsea riser system equipment (such as a BOP) is connected.

The invention may reduce loads on a subsea high pressure well head housing. This may increase the reliability/safety and/or life of the wellhead. Thus, the invention may minimise loads on critical components of a wellhead assembly.

This may be desirable because several off the shelf standard wellhead assemblies have too limited capacity (i.e. limited capacity margins). This may particularly be the case in some North Sea operations, where high wellhead loads may occur.

The connection between the subsea pressure equipment and the low pressure wellhead housing may be a direct attachment between (e.g. the bottom of) the subsea pressure equipment or indirectly such as by means of a load transmitting wellhead connector.

Typically, the subsea pressure equipment may be connected to the high pressure wellhead housing using a conventional wellhead connector. A conventional wellhead connector latches (i.e. grips and latches) on to the neck of the high pressure wellhead housing.

In the present invention the load transmitting wellhead connector may latch (directly or indirectly) onto the wellhead assembly supporting foundation/conductor (i.e. the wellhead assembly support structure, e.g. the low pressure wellhead housing (i.e. conductor housing)). With this arrangement it may be possible for more of the bending moment/loads from the subsea pressure equipment to go (i.e. be transferred) into the well foundation (e.g. through the low pressure wellhead housing or suction anchor) instead of having to pass through the high pressure wellhead housing or any other part of the wellhead assembly.

Forces may be transmitted, via the connection between the subsea riser system equipment and the conductor, from the subsea riser equipment to the conductor without going via the wellhead.

The subsea riser equipment may be connected to the conductor such that forces can be transmitted from the subsea riser equipment to the conductor such that load relief is provided to the subsea wellhead.

The forces may be transmitted from the subsea riser system equipment to the conductor during drilling, completion, and/or workover modes of operation of the wellhead assembly.

The connection between the subsea riser system equipment and the conductor may be outside (e.g. radially outwardly) of the wellhead.

The assembly may reduce riser loads transferred into a subsea wellhead. The subsea wellhead (i.e. high pressure wellhead housing) may be on, in, mounted to or connected to the conductor.

If the wellhead (i.e. high pressure wellhead housing to which the riser system equipment is connected) is connected to the conductor, the connection between the subsea riser system equipment and the conductor is in addition to the indirect connection via the high pressure wellhead housing, between the subsea riser system equipment and the conductor (which as discussed above, may be a non-conventional conductor such as suction anchor or a template).

If the wellhead (i.e. high pressure wellhead housing to which the riser system equipment is connected) is not connected to a conventional conductor, the connection between the subsea riser system equipment and the conductor (i.e. the high pressure wellhead foundation) is in addition to the direct connection via the high pressure wellhead housing, between the subsea riser system equipment and the conductor (i.e. the high pressure wellhead foundation) e.g. a suction anchor.

The subsea riser system equipment may be rigidly connected to the conductor. This allows force to effectively be transmitted from the subsea riser system equipment to the conductor.

The wellhead assembly may be a free-standing subsea wellhead assembly. This may mean that the wellhead assembly is not surrounded and/or supported by a template.

The present invention may provide an assembly for reducing riser loads in free-standing subsea wellheads.

The riser system equipment may be equipment which is attached (e.g. fluidly connected) to the wellhead that facilitates or improves the safety of operations such as drilling and completion in the well.

The riser system equipment may extend vertically up from the wellhead away from the sea bed. The riser system equipment may be connected at its other end to a riser, the upper end of which may be connected to a surface facility such as a floating vessel.

The subsea riser equipment may comprise, or be, one or more of a blowout preventer, and/or a Christmas tree (which may also be referred to as a subsea tree).

The BOP may comprise two parts, a lower stack, and a lower marine riser package (LMRP). The LMRP may be connected to the top of the lower stack by a remote controlled connector.

The lower stack may be connected on top of the wellhead or on top of a subsea tree (also called Christmas tree). This connection may also be by a remote controlled connector.

The LMRP may be connected by a flexjoint to the lower end of the marine drilling riser.

For example, during drilling a blowout preventer may be provided directly on the wellhead and during completion a blowout preventer may be provided with a Christmas/subsea tree on the wellhead. Alternatively, the subsea riser system equipment may comprise a subsea tree without a BOP.

The present invention is particularly advantageous for reducing wellhead loads in the case a BOP (as opposed to a Christmas tree only). This is because BOPs are typically much longer/higher (in a vertical direction) than a Christmas tree and thus the bending forces exerted by an unsupported BOP compared to those exerted by an unsupported Christmas tree may be much greater. This is particularly the case when the BOP is installed on top of a subsea tree (i.e. the two riser system equipments are provided together) as in this case particularly high loads may be exerted on the wellhead from the subsea riser system equipment.

Thus the subsea riser system equipment may comprise a BOP (which is either mounted directly on the subsea wellhead or mounted indirectly on the subsea well head, such as via a Christmas tree). The BOP may be (e.g. indirectly) connected to the conductor such that forces can be transmitted from the subsea riser equipment to the conductor.

When the riser system equipment comprises, or is, a blowout preventer (BOP), the BOP may comprise a lower part (which may be referred to as a lower stack or a lower BOP stack) and an upper part (which may be referred to as a lower marine riser package (LMRP)). In this case, the connection between the subsea riser system equipment and the conductor may be between the lower stack and the conductor. The assembly may be arranged so that the LMRP is not connected to the conductor (other than via the connection made with the lower stack). This is so that if required, the LMRP can be released and removed easily and quickly. For example, the LMRP may be released from the lower stack at any time.

The riser system equipment may be a subsea stack. The subsea stack may sit on the wellhead.

The conductor may be a pipe which is installed, e.g. piled or by drilling an over-size hole and installing the conductor, and cementing it in place, into the seabed.

The conductor (i.e. conductor pipe) may comprise the subsea wellhead or the subsea wellhead may be mounted in the conductor. For example, the subsea wellhead may be installed and locked into the top end of the conductor.

The conductor may be reinforced compared to a typical conductor. This is to ensure that the conductor has sufficient capacity to accommodate the additional static and cyclic loads forces that will be transmitted to it from the subsea riser system equipment. One or more additional structures, i.e. support structures, may be clamped onto the conductor to ensure that the conductor has sufficient capacity to accommodate the additional static and cyclic loads forces. The additional support structure(s) may provide improved/additional (compared to the conductor with the support structure) soil support of the conductor by increasing the effective area of the conductor immersed in the soil.

For example, in soft soil conditions, the additional structure(s) may be soil anchor devices (such as fins, cans, etc) attached to the conductor. These soil anchor devices may improve the load transfer between conductor top end, and the surrounding soil.

The conductor may be a 36×2 inch conductor.

The subsea wellhead assembly may comprise a connection device which allows the subsea riser system equipment (such as a BOP) to be connected to the conductor. Thus, the subsea riser system equipment may be connected to the conductor by a connection device (e.g. a load transmitting wellhead connector). Such a connection device may allow forces to be transmitted from the subsea riser equipment to the conductor.

The subsea well head assembly, e.g. the connection device, may comprise a connection bracket. The bracket may be mounted on the conductor. The bracket may permit the subsea riser system equipment to be connected to the conductor. The bracket may provide a convenient means for permitting a connector and/or connection members to be connected to the conductor.

If the assembly comprises a suction anchor foundation, the connection bracket may be the top annular horizontal part (e.g. plate) of the suction anchor.

The connection (e.g. using a load transmitting wellhead connector) between the low pressure wellhead housing and the subsea riser system equipment may pull the high pressure wellhead housing and the low pressure wellhead housing together in an axial direction. This may create an additional compressive force between them, e.g. at the landing shoulder between the high and low pressure wellhead housings. Thus the connection may maintain a compressive force between the high pressure wellhead housing and the low pressure wellhead housing, i.e. maintain a compressive force which is additional to that caused by the weight of the subsea riser system equipment on the wellhead.

The standard connection between the high pressure wellhead housing and the subsea riser system equipment may be unchanged, for example the top of the high pressure wellhead housing may still have a conventional profile, e.g. a Vetco H4 profile, that a conventional wellhead connector can connect to and so do all operations done today.

The connection between the low pressure wellhead housing and the subsea riser system equipment may be additional to the connection between the high pressure wellhead housing and the subsea riser system equipment. Thus the assembly may comprise both a conventional wellhead connector that is latched onto the high-pressure housing, and an external load-carrying connector that is latched onto the low-pressure housing.

The connection bracket may be a guidebase, such as a preliminary or temporary guidebase or a permanent guidebase.

In known systems a guidebase is a component which is used during installation as part of a guiding means for guiding and aligning the subsea riser system equipment, such as the Christmas tree and/or the BOP, onto the wellhead. The guidebase comprises a number of guideposts to which guidewires can be attached. Typically, during installation, guide wires from the rig are attached to the guideposts of the guidebase. The guidewires and guideposts are used to provide guidance for the subsea riser system equipment from the rig down to the wellhead system. Typically the guideposts are received in funnels or channels in the subsea riser system equipment. However, the guideposts are not, and not intended to be, attached to the subsea riser system equipment such that forces (additional to the alignment and guiding forces) can be transmitted from the subsea riser system equipment to the conductor.

A guidebase is a well-known term of the art. This term refers to a component attached the conductor which is used during the installation process of a subsea wellhead assembly.

The connection bracket (which may be referred to as a connecting piece) on the low pressure wellhead housing may be connected to the load transmitting wellhead connector.

The connecting piece/connection bracket may be designed to be retrofit to a standard (i.e. pre-existing and/or unmodified) and/or preinstalled low pressure wellhead housing.

The method may comprise retrofitting an installed low pressure wellhead housing with a connecting piece. The method may comprise connecting the low pressure wellhead housing to the pressure equipment via the retrofit connecting piece.

In the present invention the connection bracket, e.g. guidebase, may be located on the conductor (i.e. either a traditional conductor or a device that provides the function of a traditional conductor such as a suction anchor). For example, the connection bracket, e.g. guidebase, may be part of the conductor or might be fixed to the conductor. The connection bracket, i.e. connection piece, may be fixed such as clamped or welded onto the conductor.

The subsea riser system equipment may be connected to a wellhead support such that at least some of the loads can be transferred into the conductor without being transferred via the high pressure wellhead housing.

The connecting piece may comprise two parts. These two parts may be fixed together, such as by welding or screwing/bolting them together, to form the connecting piece. Each part may be annular. These two parts may be fixed around (i.e. above and below) an annular protrusion and/or recess on the low pressure wellhead housing/conductor to thereby clamp to the low pressure wellhead housing. The first may be a support ring and the second part may be a locking ring.

The support ring may have an external diameter that is larger than the low pressure wellhead housing. When the support ring is located around the low pressure wellhead housing it may be in contact with the subsea well foundation and/or a wellhead support. This may allow loads from the low pressure wellhead housing to be spread into the foundation and/or wellhead support.

The low pressure wellhead housing may be, or may be located within, the central tube of a suction anchor. Thus, the subsea well assembly may comprise a suction anchor. The wellhead support may be the support frame which is located on a suction anchor, template or other high pressure wellhead foundation. The connecting piece (e.g. support ring and/or locking ring) may have an external profile onto which the load transmitting wellhead connector can be connected.

The connecting piece, together with a load transmitting wellhead connector may allow loads to be transmitted from the pressure equipment fluidly connected to the high pressure wellhead housing into the low pressure wellhead housing without going via the high pressure wellhead housing.

The connection bracket, which may be a guidebase, may have one or more features of the above described known guidebase. For example, the guidebase may comprise one or more (such as four) guideposts.

The guidepost(s) may be installed in special guidepost receptacles.

If the assembly comprises a suction anchor, the guide posts may be mounted on the top annular part of the suction anchor.

The guidebase, if provided, may be reinforced compared to a typical, known or standard guidebase. For example, the guidebase may be thicker (in a vertical direction, or direction parallel to the central axis of the conductor) than a typical guidebase. In other words, the guide base may be stronger than a typical guidebase in order to accommodate vertical loads from supporting the subsea riser system equipment. The guidebase may comprise more steel than a typical guidebase. The guide base may comprise larger dimensions than a typical guide base. For example it may be thicker than a typical guide base.

A conventional guidebase is exposed to moderate loads, typically 5 tonnes wire tension through guideposts, and some lateral guiding forces.

The reinforced guidebase and connection members (which connect the subsea riser system equipment to the guidebase) may participate in the transfer of large tension or compression forces between the BOP, and the conductor. The maximum bending moments in the wellhead, without the connection to the conductor (e.g. without using a guidebase and vertical members), would typically be in the range 1000-10000 kNm, and the connection (e.g. guidebase, and verticals) and the conductor, need be designed to accommodate (at least a large portion of) these loads.

With the present invention it may be possible and/or may be ensured that the wellhead is exposed to only moderate riser loads, well within documented capacity of off the shelf equipment (e.g. permissible load limit).

If the connection bracket is a guidebase, the guidebase may be larger than a typical, known or standard guidebase. For example, a typical guidebase is 3.5 m by 3.5 m. The connection bracket, e.g. guidebase, of the present invention (if present) may have lateral dimensions which are 4 m by 4 m or at least 4 m by 4 m, e.g. 4.8 by 4.8 m.

The connection bracket of the present invention may have lateral dimensions which are the same as those of the subsea sea riser system equipment (e.g. a BOP). In other words, the cross sectional shape and area of the connection bracket may be the same as the subsea sea riser system equipment (e.g. a BOP which may have a maximum foot print of 4.8 by 4.8 m for example).

By lateral dimensions is meant the horizontal dimensions of the connection bracket, i.e. dimensions parallel to the radial direction of the conductor.

The subsea riser system equipment (such as the BOP) may be connected to the conductor via the connection bracket, e.g. guidebase.

When the connection bracket is a guidebase, in the present invention the guidebase may initially be used to guide the subsea riser system equipment onto the wellhead and then, once the subsea riser system is installed, e.g. mounted on the wellhead, the guidebase may be used to connect the subsea riser system equipment to the conductor such that forces can be transmitted from the subsea riser system equipment to the conductor.

The advantage of connecting the subsea riser system equipment to the conductor via a connection bracket, such as a guidebase, is that the connection between the subsea riser system equipment (such as a BOP) and the conductor may be at an increased radial distance compared to if the subsea riser system equipment was connected directly to the conductor. This means that more force (i.e. a substantial part of the riser loads) can be transmitted from the subsea riser system equipment to the conductor without going via the wellhead. It also means that the connection can be retrofit onto a preinstalled or pre-manufactured conductor that may not have a suitable point for direct connection to a load transmitting connector.

The load transmitting wellhead connector (which may be additional to the conventional wellhead connector between the high pressure wellhead housing and the subsea riser equipment) may comprise a plurality of collet fingers and/or a locking mechanism. These may latch directly on the low pressure conductor housing and/or the connection bracket (if present). This connector may have the function of pulling the high pressure wellhead housing and the low pressure wellhead housing together and/or holding them together in compression.

The load transmitting wellhead connector may connect directly between the subsea riser system equipment and the low pressure wellhead housing. The load transmitting wellhead connector may be integral with the subsea riser system equipment.

The connection device may comprise one or more (such as four, six. Eights or twelve etc) connection members. These may also be referred to as link elements.

The connection member(s) may each extend parallel (or substantially parallel) to the axis of the wellhead, i.e. in a substantially vertical direction.

Additionally or alternatively, the connection member(s) may each extend at an angle (i.e. non-parallel) to the axis of the wellhead. This may allow the connection member(s) to also carry horizontal shear loads.

When there are a plurality of connection members, these may located about the wellhead. The connection members may be positioned approximately equidistant around the wellhead. For example, in the case of three connection members they may be located at about 120 degrees apart around the wellhead, or in the case of four connection members they may be located at about 90 degrees apart around the wellhead. This is so that force can be transmitted evenly from the subsea riser equipment to the conductor.

The connection member(s) may laterally support the riser system equipment and/or may reduce the loads or forces transferred to the wellhead from the riser system equipment compared to an assembly without any connection members.

The connection member(s) may be arranged so as to transmit forces between the riser system equipment and the conductor. The connection member(s) may be in tension or compression. For example, the connection member(s) may be preloaded to be substantially in tension or compression.

The connection member(s) (i.e. support member) may be a rod or bar which is in compression (e.g. preloaded to be substantially in compression).

The connection member(s) may each be a steel beam such as a solid steel beam.

The connection member(s) may be provided by or incorporate a rigid frame which is between the connection bracket, e.g. guidebase, and the subsea riser system equipment.

The connection member(s) may be, or comprise, a line which is in tension. The line, for example, could be a wire, rope, cable, tether or chain etc. The line may be formed from a plurality of steel wire parts which are connected together to form a line.

The connection member(s) may rigidly connect the riser system equipment and the conductor (such as via a connection bracket mounted on the conductor).

The connection member(s) may carry a substantial part of the bending moment that may otherwise be transferred through the connector between the subsea riser system equipment and the high pressure wellhead housing.

The connection member(s) may be axially rigid and may transfer both tensile and compressive loads. The connection members may comprise or be connected to tensioners (to put the connection member into tension) and/or jacks (to put the connection member into compression).

The connection member may be made up of a number of parts such as a number of connected lines or other components.

Each connection member may provide a force transmission line between the conductor and the subsea riser system equipment.

The connection members may each be connected to the conductor and/or the subsea riser system equipment. For example, one end of a connection member may be connected (directly or indirectly) to the conductor and the other, opposite end of the connection member may be connected (directly or indirectly) to the subsea riser system equipment.

The connection member(s) may be directly connected to the subsea riser system equipment and/or the conductor or the connection member(s) may be indirectly connected to the subsea riser system equipment and/or the conductor such as via one or more connection parts such as a bracket or clamp which is attached directly to the riser system equipment or the conductor. In any event, even if not directly connected to the riser system equipment and/or conductor, the one or more connection members may each extend directly between the riser system equipment and the conductor and permit forces to be transmitted from the subsea riser system equipment to the conductor.

The connection member(s) may transmit forces directly between the subsea riser system equipment and the conductor.

When the connection device comprises a connection bracket (such as a guidebase mounted on the conductor) the connection member(s) may connect the subsea riser system equipment (such as a BOP) to the connection bracket so that forces can be transmitted from the subsea riser equipment to the conductor.

The connection bracket may be directly connected to the conductor.

The connection member(s) may each be a longitudinally extending member, i.e. elongate member, which attaches at one end to a part of the subsea riser system equipment and at the other end to the connection bracket (e.g. guidebase).

One end of a connection member may be connected (directly or indirectly) to the connection bracket, e.g. a guidebase. The other, opposite end of the connection member may be connected (directly or indirectly) to the outer frame or base of the subsea riser system equipment. This may be at or near the corners and/or outer edges of the subsea riser system equipment. This is to maximise the distance between the centre of the wellhead and the connection that transmits the forces from the subsea riser system equipment and the conductor.

The connection member may be connected to, or engage with, a base portion of the subsea riser system equipment such as a bottom plate or frame of a BOP or subsea tree.

Each connection member may hook onto the base (or a component such an eyelet/pad-eye attached to the base) of the subsea riser system equipment.

The connection member(s) may each provide, or being arranged so as to be able to provide, a rigid connection between the subsea riser system equipment and the conductor.

The connection member(s) may be of a fixed length and as a result may act as beams, e.g. rigid beams, which transfer forces from the subsea riser system equipment to the conductor. Alternatively, the connection members may have a length which is adjustable.

The connection members may provide a rigid connection between the subsea riser system equipment and the conductor.

The subsea well assembly may be preloaded to have a compression between the high pressure wellhead housing and the low pressure wellhead housing (i.e. substantially axial compression). This preload may be maintained by the load transmitting wellhead connector.

This may allow bending moments to be transferred into the low pressure wellhead housing without inducing too much stress (e.g. by reducing the load) in the high pressure wellhead housing.

The connection members may be preloaded, e.g. in tension or in compression, and/or be neutral. This may be in the axial or at least substantially axial direction.

When the connection bracket is a guidebase, the connection members may comprise the guideposts of the guidebase. In this case the guideposts may be connected, such as rigidly connected, to the subsea riser system equipment. For example, the subsea riser system equipment may be latched onto one or more, or all, of the guideposts. This is so that the guideposts can be used to transmit forces from the subsea riser system equipment (optionally via a connection bracket) into the conductor. The guide posts may be used additionally or alternatively to allow load transfer between the subsea riser system equipment and the conductor (i.e. well head foundation).

If the guideposts are the connection members, the guideposts may be reinforced/strengthened compared to known guideposts. For example, the wall thickness may be increased and the connections between the guideposts and the guide base may be made stronger. Additionally, there may be some device to permit locking of the guide posts to the subsea riser system equipment. This may for example be a remote controlled clamp or lock device between BOP guide-funnels and the guideposts. This may allow the guideposts to transfer axial (vertical) loads and thereby support the subsea riser system equipment and thus accommodate part of the riser induced loads.

The guideposts may be suitable for transmitting forces from the subsea riser system equipment to the conductor and/or for helping to relief wellhead loads.

Alternatively or additionally, the connection device may comprise connection member(s) additional to the guideposts (if the guideposts are present). In other words, the connection device may comprise connection member(s) which are not guidepost(s), e.g. not used for guiding the subsea riser system equipment during installation.

The additional connection members (if present) may be located radially outwardly of the guideposts of the guidebase. This is to maximise the distance of the connection between the conductor and the subsea riser system equipment from the centre of the wellhead. This is so that the load effect will be lower for a given riser load level. In a typical system the guide posts are each at a distance of 72 inches (about 1.8 m) from the wellhead centre. The connection members may thus be at a distance greater than 72 inches (about 1.8 m) from the wellhead centre.

When connection member(s) are provided additional to the guideposts, the guideposts (if present) may not transmit any forces from the subsea riser system equipment to the conductor, i.e. the guideposts may perform only their normal function of acting as guide means and not force transmitting means.

The connection member(s) may each be a steel beam or rod. The steel beam or rod may have a diameter of at least 5 cm, such as 5 to 20 cm or 10 to 15 cm.

Each connection member may be attached (e.g. directly) at one end to the conductor or connection bracket and/or each connection member may be attached (e.g. directly) at the other end to the subsea riser system equipment, such as a BOP.

The connection between the subsea riser system equipment and the conductor (which may be via a connection bracket, such as a guidebase, on the conductor) may, at least in part, be in compression (in an at least substantially axial direction). In this case, the connection between the subsea riser system equipment and the conductor may comprise a (i.e. at least one) jack. When the connection between the subsea riser system equipment and the conductor is in compression, the connection between the subsea riser system equipment and the wellhead may be in tension.

The connection between the subsea riser system equipment and the conductor may, at least in part, be in tension. In this case, the connection between the subsea riser system equipment and the conductor may comprise a (i.e. at least one) tensioner (e.g. turnbuckle). When the connection between the subsea riser system equipment and the conductor is in tension the connection between the subsea riser system equipment and the wellhead may be in compression.

The connection device (such as one or more, or each of the connection members) may be provided with or comprise a preload device for allowing a preload to be exerted on the connection member.

The preload device may be integral with a respective connection member. Alternatively the preload device, e.g. the tensioner or jack, may be separate from the connection members. In either case the preload device(s) may act to preload the connection member(s).

The preload device may be used to remove slack/play in the connection device. This may ensure that forces can be transmitted most effectively from the subsea riser system equipment to the conductor via the connection device.

The preload device(s) may each be arranged to provide a preload in the range of 100-1000 kN, such as 500 to 1000 kN.

For example, the preload device may be a tensioner for putting the connection member (and hence the connection between the subsea riser system equipment and the conductor) into tension.

The connection member(s) may each be provided with a tensioner, i.e. a device that can act to cause a tension on the connection member to which it is attached. The tensioner may be used to put the connection member into tension so as to be able to transmit forces between the riser system equipment and the conductor. The tensioner may be used to provide a pretension on the connection member(s). This is so that the connection member(s) can be used to reduce (compared to an assembly without connection member(s)) the load which is transmitted to the wellhead from the riser system equipment.

The tensioner may be of a linear type, such as a chain jack, a chain hoist, or a screw jack tensioner (this may also be referred to as a mechanical rope tensioner).

The preload device may be a device, such as a jack, for putting the connection member (and hence the connection between the subsea riser system equipment and the conductor) into compression.

Each preload device, e.g. tensioner(s) or jack(s), may be operable using an ROV.

The ROV operated tensioners may lock to the subsea riser system equipment by hooks (or some other means) and act to pull the subsea riser system equipment downwards. If the assembly comprises guidepost these may include clamps to lock them to the subsea riser system equipment. This may be with or without preloading.

Each preload device may be arranged so that it can be remotely controlled.

Each preload device may be arranged so that it can be remotely released.

Each preload device may be arranged so that it can be mechanically released by a ROV.

Each preload device may be controlled and/or powered by use of a mechanical, hydraulic or electric method.

Each preload device may be arranged so that it can be set up and operated using a remotely operated vehicle (ROV), e.g. a ROV manipulator. This means that the assembly may be installed and set up subsea and at any water depth without difficulty.

Each preload device may comprise a ROV torque bucket. This is so that each preload device can be operated using an ROV operated torque tool.

The method of installing the subsea wellhead assembly may comprise connecting the subsea riser system equipment to the conductor using a connection device (which may comprise one or more connection members). The connection device, such as each connection member of the connection device, may comprise a preload device, such as a tensioner and a jack, and the method may comprise preloading the connection between the subsea riser system equipment and the conductor such that forces can be transmitted from the subsea riser system equipment to the conductor.

The preloading may be done using an ROV. The ROV may be used to operate the preload device.

The preload device, e.g. tensioner or jack, may be operated, such as by an ROV, after the subsea riser system equipment (such as the BOP) has been mounted on the wellhead. The operation of the preload device may put the connection device into compression or tension (depending for example on whether the preload device is a jack or tensioner) and may put the connection between the subsea riser system equipment and the wellhead into tension or compression respectively.

In the case of the preload device being a jack, the wellhead may be put into tension if the preload exerted by the jacks on the subsea riser system equipment is greater than the weight (i.e. submerged weight) of the subsea riser system equipment.

With the present invention, loads may be transferred from the subsea riser system equipment to the conductor via the connection device (which may comprise a connection bracket and connection member(s)).

The loads may be subsea riser system equipment forces (such as BOP riser forces and/or marine drilling riser forces).

The amount of force which is transmitted from the subsea riser system equipment to the conductor compared to the amount of force which is transmitted from the subsea riser system equipment to the wellhead may depend on the relative stiffness between the connection between the subsea riser system equipment and the conductor and the connection between the subsea riser system equipment and the wellhead.

For example, if the stiffness of the connection between the subsea riser system equipment and the conductor is the same as the stiffness of the connection between the subsea riser system equipment and the wellhead, the load reduction on the wellhead may be 50%, or the load may be reduced by a factor of 2, such as a factor between 2 to 4.

The wellhead bending moments may be reduced by a factor of 2 to 10 or 5 to 10, depending on the stiffness ratio between the connection between the subsea wellhead and the subsea riser system equipment and the connection between the subsea riser system equipment and the conductor.

The connection device may provide lateral support to the subsea riser system equipment from the conductor.

With the present invention, because the subsea riser system equipment, e.g. blowout preventer (BOP), is connected to the conductor, it is possible for the conductor to provide lateral support to the riser system equipment, e.g. BOP, connected to the wellhead. This support may be provided during drilling, completion, and/or workover modes of operation of the wellhead assembly.

Connecting the subsea riser system equipment to the conductor such that forces can be transmitted may occur after the subsea riser system equipment is connected to the wellhead.

With the present invention the likelihood of structural failure of the wellhead assembly due to high static or variable loads may be maintained as low as possible.

The present invention may provide a method of controlling (e.g. reducing and/or minimising) the loads imposed for example by a drilling facility, etc., on a subsea wellhead.

The assembly may be for, or used for, reducing riser system induced load effects on the subsea wellhead. Thus the present invention may be considered to provide an assembly or a method for reducing riser system induced load effects in subsea wellheads.

The connection between the subsea riser system equipment and the conductor may be for reducing riser system induced load effects on the subsea wellhead.

Because the subsea riser system equipment (e.g. the BOP) is connected to the conductor, it is possible for the loads transferred to the wellhead from the riser system (which includes the riser and the subsea riser system equipment) to be reduced (e.g. substantially reduced), for example loads due to riser system equipment or riser motions (such as vibrations). These loads may be cyclic fatigue loads and/or accidental or abnormally high single-loads. In other words, the connection may be arranged to reduce the effects of both cyclic loads and high single loads.

The assembly may reduce the loads transferred to the wellhead from the riser system equipment by 25% or more or 50% or more, (e.g. at least 25%, at least 30%, at least 40%, at least 50%, 50% to 60%, at least 60% or at least 75%) compared to a situation without such a connection.

The connection between the subsea riser system equipment and the conductor may be arranged so that the bending moments exerted on the wellhead by the riser system equipment is reduced by at least 50%.

The connection between the subsea riser system equipment and the conductor may be arranged so that it increases the stiffness of the assembly.

The load distribution between 1) the wellhead, and 2) the conductor and the connection may depend on the relative stiffness between the two connections. The connection may be designed and/or arranged so that it is able to reduce the loads on the wellhead from the subsea riser system equipment such that material fatigue failure no longer needs to be a concern during a typical lifetime of the subsea wellhead assembly.

The connection may be designed and arranged so that it is able to reduce the loads on the wellhead from the subsea riser system equipment sufficiently such that structural damage of the subsea wellhead assembly due to abnormally high single loads no longer needs to be a concern.

For extreme accidental event scenarios, the total horizontal (lateral) force component from the riser (e.g. connected by a flex joint), exerted to the top of the BOP, e.g. 10-15 m above wellhead datum, may be predicted to be in the range 500-800 kN.

The riser system equipment may be connected to the wellhead, and then once connected to the wellhead, the subsea riser system equipment may be connected to the conductor by the one or more connection members. The present invention may provide a method of installing a subsea wellhead assembly with any, one or more of the above described features, including optional features.

One or more of the features, including the optional or preferable features, of any of the above described aspects are applicable to any of the other above described aspects of the invention.

Certain preferred embodiments of the present invention will now be described by way of example only with reference to the accompanying drawings, in which.

Figure 1:
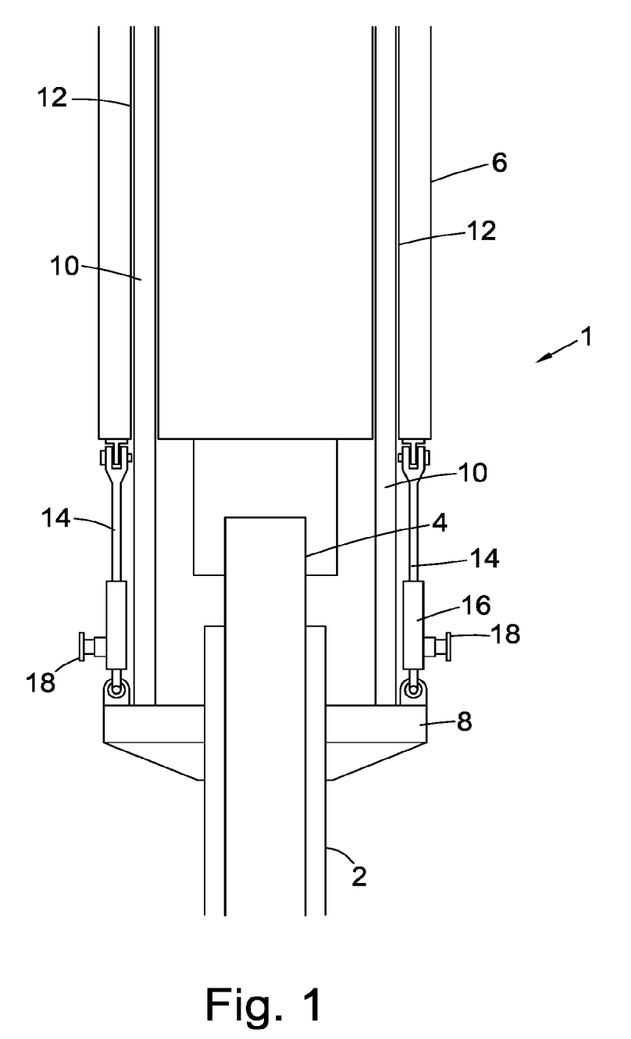
FIG. 1 shows a schematic of a first subsea wellhead assembly.

A subsea wellhead assembly 1 is shown in FIG. 1. The assembly comprises a conductor 2 which may be piled into the seabed. A subsea wellhead 4 is landed in the conductor 2. Subsea riser system equipment 6, such as a BOP and/or a subsea tree, is mounted on the wellhead 4. A guidebase 8 is clamped to the conductor 2.

The guidebase 8 may be strengthened or reinforced compared to known guidebases.

The guidebase 8 has a plurality of guideposts 10 which may be installed in special guidepost receptacles. The guideposts 10 are received in channels (e.g. guide-funnels) 12 in the subsea riser system equipment 6.

During installation the guideposts 10 and the channels 12 are used, together with guidelines (i.e. guide wires) attached to the guideposts (which are not shown), to guide the subsea riser system equipment 6 and align it onto the wellhead 4.

The subsea wellhead assembly 1 also comprises a plurality of connection members 14, such as four connection members 14 which are located at about 90 degrees separation about the wellhead 4. The connection members 14 connect the subsea riser system equipment 6 to the guidebase 8. This provides a connection between the subsea riser system equipment 6 and the conductor 2 which permits forces (e.g. in both tension and compression) to be transmitted from the subsea riser equipment 6 to the conductor 2. This connection allows the loads experienced at the wellhead 4 to be reduced.

In the arrangement shown in FIG. 1 each connection member 14 comprises a tensioner 16. Each tensioner 16 may be used to put a preload on the connection member 14 which puts the connection member 14 into tension and the connection between the subsea riser system equipment 6 and the wellhead 4 into compression. The tensioner can ensure that the subsea riser system equipment 6 is rigidly connected to the conductor 2 so that forces can be transmitted effectively therebetween.

Each tensioner 16 may have an activation means 18. The activation means 18 may be a torque bucket which allows a torque to be applied to the tensioning mechanism. The torque bucket 18 may be operable by an ROV equipped with a torque tool.

To install the assembly the conductor 2 may be piled (or otherwise installed, e.g. by drilling an over-size hole and installing the conductor, and cementing it in place) into the sea bed.

Once the conductor 2 is installed, the wellhead 4 may be landed into the conductor.

The guidebase 8 with the guideposts 10 may be clamped onto the conductor 2. This may either be done topside before the conductor 2 is taken subsea or after the conductor 2 has been planted/located in the sea bed.

The subsea sea riser system equipment 6 may then be landed on the wellhead 4. The subsea riser system equipment 6 is guided onto the wellhead using the guideposts 10. The guideposts 10 are connected to guide wires which extend to the surface. The guide wires extend through the channels 12 of the subsea riser system equipment 6 and are used to guide the guideposts 10 into the channels 12 so as to align the connection portion of the subsea riser system equipment 6 with the wellhead 4.

Once the subsea riser system equipment 6 is mounted on the wellhead the connection members 14 may be used to connect the subsea riser system equipment 6 to the guidebase 8.

The connection members 14 once connected between the guidebase 8 and bottom of the subsea riser system equipment 6 may be put into tension using the tensioners 16 associated with each connection member 14. The tensioners 16 may be operated using an ROV which applies a torque using the activation means 18.

Once the connection members 14 are put into tension they may provide a connection between the subsea riser system equipment 6 and the conductor 2 (via the guidebase 8) which permits forces to be transmitted from the subsea riser system equipment 6 to the conductor 2. This may provide load relief for the wellhead 4.

Figure 2:
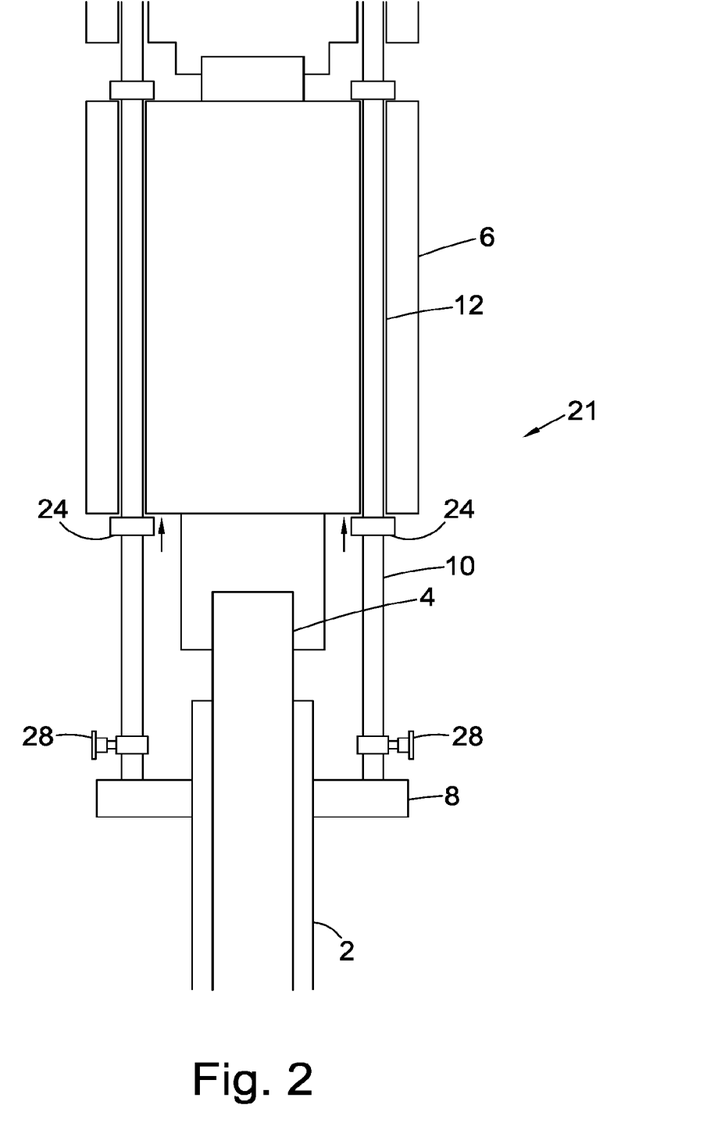
FIG. 2 shows a schematic of a second subsea wellhead assembly.

FIG. 2 shows an alternate subsea wellhead assembly 21.

Similarly to the subsea wellhead assembly 1 shown in FIG. 1, the assembly 21 comprises a conductor 2 installed (e.g. piled) into the seabed, a subsea wellhead 4 landed in the conductor 2, subsea riser system equipment 6, such as a BOP and/or a subsea tree, mounted on the wellhead 4 and a guidebase 8 which is clamped to the conductor 2.

Similarly to the assembly 1 shown in FIG. 1, in assembly 21 the guidebase 8 has a plurality of guideposts 10 which are received in channels 12 in the subsea riser system equipment 6 and are used to guide the subsea riser system equipment 6 onto the wellhead 4 during installation as discussed above.

The assembly 21 of FIG. 2 differs from the assembly 1 of FIG. 1 in that the guideposts 10 are also used as connection members which connect the subsea riser system equipment 6 to the conductor 2.

This may be achieved using integrated ROV operated jacks 24 which are on each of the guideposts 10. After the subsea riser system equipment 6 has been mounted on the wellhead 4 (the procedure for which is set out above) the jacks 24 may be operated to put each of the guideposts 10 into compression.

This may be achieved using an ROV which applies a torque via the activation means 28.

The jacks 24 exert an upward force on the subsea riser system equipment 6. This puts the guideposts 10 into compression and, once the upward force is greater than the weight of the subsea riser system equipment 6, puts the connection between the wellhead 4 and subsea riser system equipment 6 into tension.

Once the jacks 24 have been activated a connection is formed between the subsea riser system equipment 6 and the conductor 2 that allows forces to be transmitted from the subsea riser system equipment 6 to the conductor 2. This may provide load relief for the wellhead 4.

Figure 3:
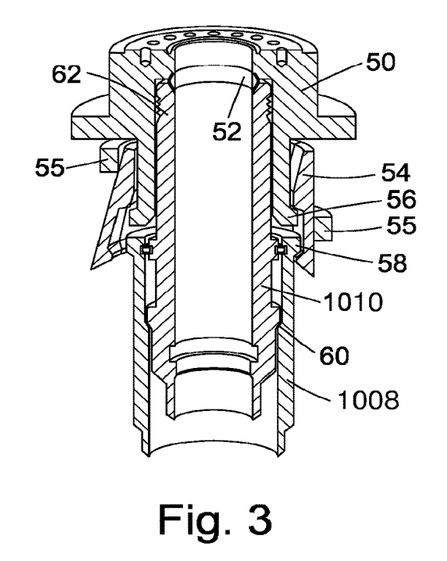
FIG. 3 shows a cross sectional view of a connection between part of subsea riser system equipment and a low pressure wellhead housing.

An alternative connection is shown in FIG. 3. As shown in FIG. 3, when a subsea riser equipment 50 (e.g. a Christmas tree or BOP) is mounted on the high pressure wellhead housing (i.e. subsea wellhead) 1010 and sealed thereto by seal 52, the subsea riser equipment 50 may also be connected to the low pressure wellhead housing 1008 via a connector 54.

The connector 54 may allow loads to be transmitted directly from the subsea riser equipment 50 into the low pressure wellhead housing (i.e. conductor) 1008 without going (i.e. being transmitted) via the high pressure wellhead housing 10. This may reduce the loads transmitted from the subsea riser equipment 50 to the high pressure wellhead housing 1010.

The connector 54 may be connected directly between an annulus 56 on the subsea riser equipment 50 and an annulus 58 on the low pressure wellhead housing 1008.

The connector 54 may be a plurality of collet fingers extending around the circumference of the parts being joined. The arrangement may comprise a locking ring 55 that can be used to lock the connector 54 when desired. The right-hand side of the figure shows the connector 54 in a closed position and the left-hand side of the figure shows the connector 54 in an open position. This connector 54 may be in addition to a connector between the high pressure wellhead housing 1010 and the subsea riser system equipment 50 (although no such connector is shown in FIG. 3).

A preload may be put on the assembly so that there is a compressive force between the high pressure wellhead housing 1010 and the low pressure wellhead housing 1008. This preload may be at the landing shoulder 60 between the high pressure wellhead housing 1010 and the low pressure wellhead housing 1008.

The connection between the high pressure wellhead housing 1010 and the subsea riser equipment 50 may not need to be adjusted/modified and so for example the high pressure wellhead housing 1010 may have a H-4 wellhead profile 62.

The low pressure wellhead housing 1008 may be integrally formed with an annulus 58 onto which the connector 54 can connect.

The annulus may instead be provided by a connecting piece 59 (as shown for example in FIG. 4) on the low pressure wellhead housing 1008 to which the load transmitting wellhead connector 54 may be connected. The connecting piece 59 may be designed to retrofit to a standard and/or preinstalled low pressure wellhead housing 1008. The connecting piece 59 may be fixed such as welded or clamped onto the low pressure wellhead housing 1008. The connecting piece 59, together with the load transmitting wellhead connector 54 may allow loads to be transmitted from the pressure equipment 50 fluidly connected to the high pressure wellhead housing 1010 into the low pressure wellhead housing 1008 without going via (i.e. such that only a limited part of the riser loads are transferred via) the high pressure wellhead housing 1010.

Figure 4:
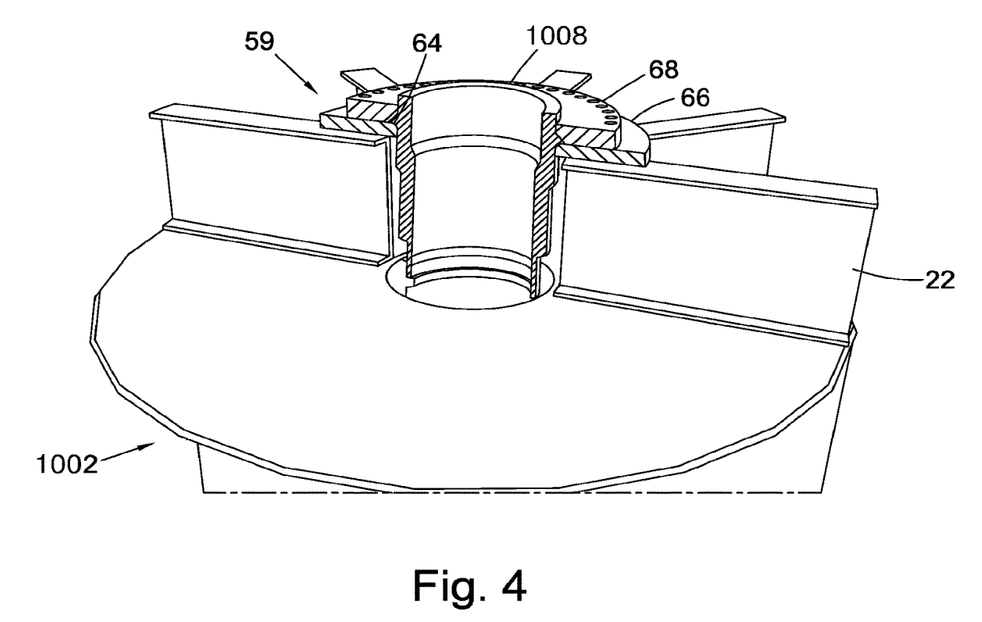
FIG. 4 shows a cross sectional perspective view of a connection piece to permit a connection between a low pressure wellhead housing an subsea riser system equipment.

The connecting piece 59 may comprise two parts. These two parts may be fixed together, such as by welding or screwing/bolting them together, to form the connecting piece 59. These two parts may be fixed/clamped around an annular protrusion 64 on the low pressure wellhead housing 1008 to thereby clamp to the low pressure wellhead housing 1008. The two parts may be a support ring 66 and a locking ring 68. When the support ring 66 is located around the low pressure wellhead housing 1008 it may be in contact with the well support 22. This may allow loads from the low pressure wellhead housing 1008 to be spread (i.e. transferred) into the foundation 1002 and/or wellhead support 22 (which may each or both be referred to in the context of the present specification as a conductor).

The connecting piece 59 (e.g. support ring 66 and/or locking ring 68) may have an external profile (although this is not shown in FIG. 4) onto which the load transmitting wellhead connector 54 can be connected.

Figure 5:
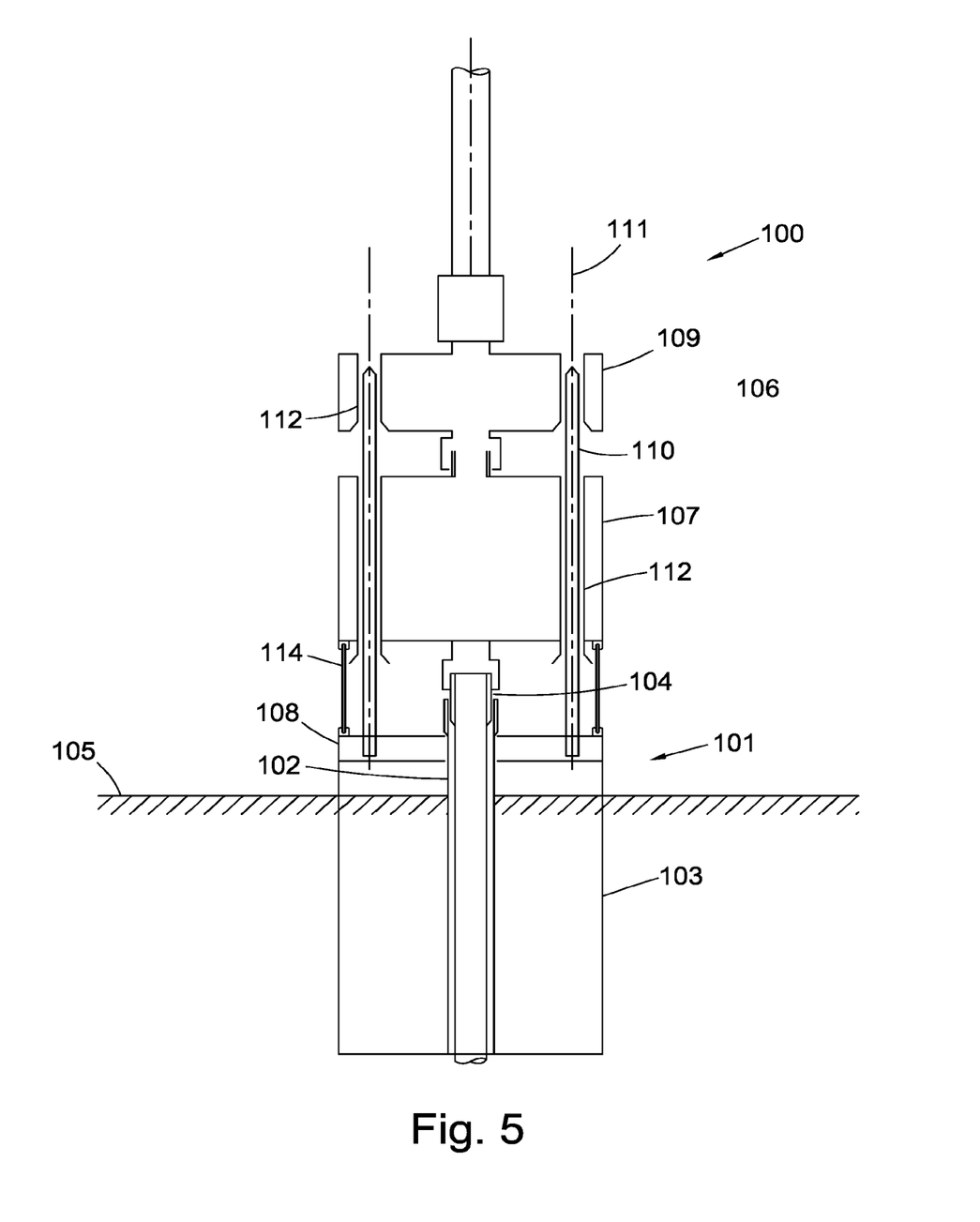
FIG. 5 shows a schematic of a third subsea wellhead assembly.
Figure 6:
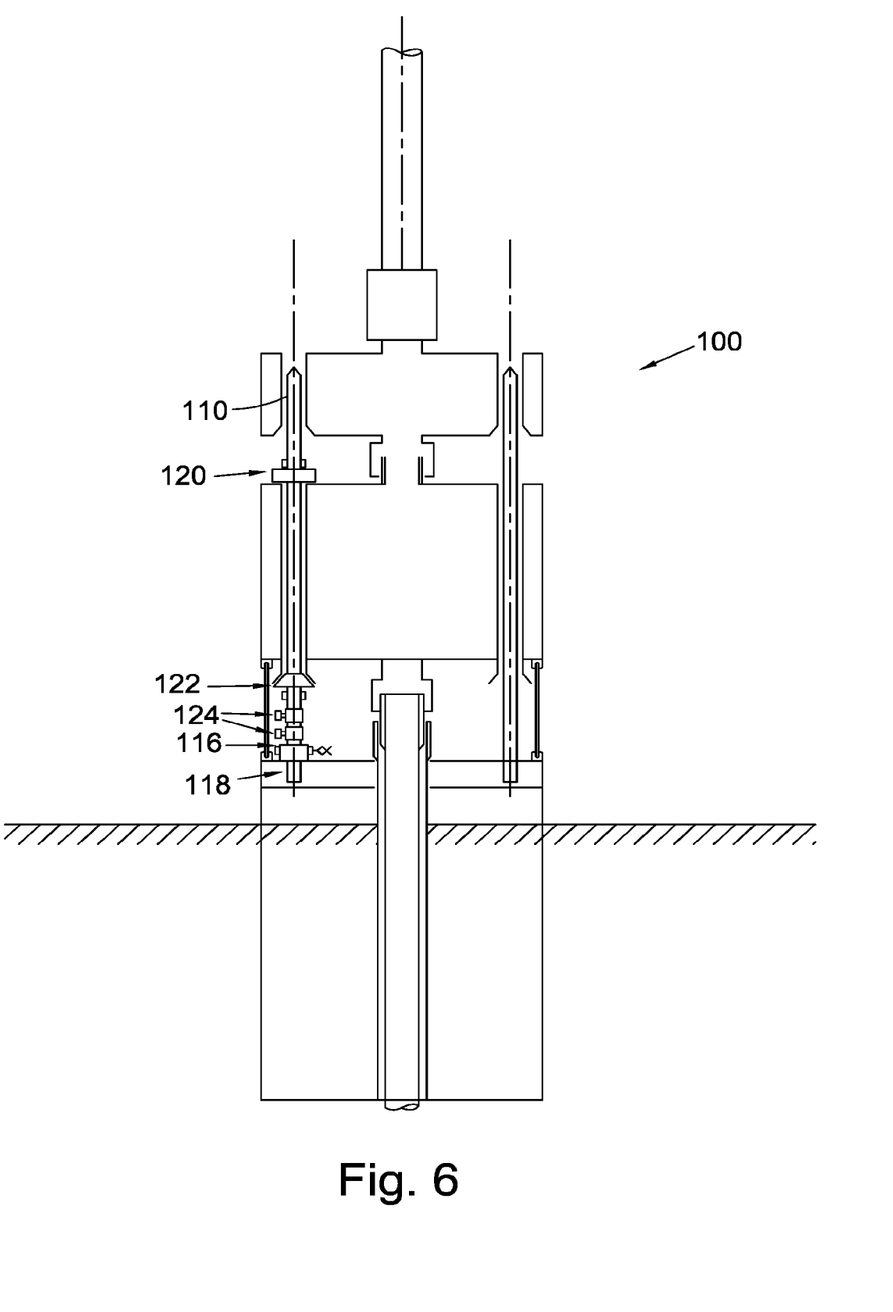
FIG. 6 shows a schematic of a fourth subsea wellhead assembly

Another subsea wellhead assembly 100 is shown in FIGS. 5 and 6. The assembly comprises a suction anchor 101. The suction anchor 101 comprises an outer suction skirt 103 and a top annular part (in this embodiment, a plate) 108 that acts as a guide base. The top annular plate 108 is shown connected to a low pressure wellhead housing 102 although the low pressure wellhead housing 102 is optional. If the low pressure well head housing 102 is not present the top annular plate may be directly connected to the high pressure wellhead housing 104. In this embodiment the outer suction skirt 103 and the low pressure wellhead housing 102 (if present) may be regarded as conductors. These components act as wellhead foundations and provide support between the high pressure wellhead housing 104 and the sea bed 105.

Subsea riser system equipment 106, such as a BOP and/or a subsea tree, is mounted on the wellhead 104. The subsea riser system equipment 106 may be made up of a lower stack 107 to a lower marine riser package 109 as shown.

The top annular plate 108 of the suction anchor may be strengthened or reinforced compared to known suction anchors so that it can provide support to the subsea riser system equipment 106.

The plate 108 supports a plurality of guideposts 110 which may be installed in special guidepost receptacles. The guideposts 110 are received in channels 112 in the subsea riser system equipment 106.

During installation the guideposts 110 and the channels 112 are used, together with guidelines (i.e. guide wires) 111 attached to the guideposts, to guide the subsea riser system equipment 106 and align it onto the wellhead 104.

The subsea wellhead assembly 100 also comprises a plurality of link elements 114, such as four connection members 114 which are located at about 90 degrees separation about the wellhead 104. The link elements 114 connect the subsea riser system equipment 106 to the plate 108. This provides a connection between the subsea riser system equipment 106 and the suction anchor 103 which permits forces to be transmitted from the subsea riser equipment 106 to the suction anchor 103. This connection allows the loads experienced at the wellhead 104 to be reduced.

In the arrangement shown in FIG. 5 each link element 114 may be preloaded in compression or tension. This can ensure that the subsea riser system equipment 106 is rigidly connected to the suction anchor 103 so that forces can be transmitted effectively therebetween. Such a transmission of force may be maintained through all link elements 114 even if forces are applied to the subsea riser system equipment 106 such that if it tilts or tries to tilt relative to the suction anchor 103.

If the guide posts 110 are strengthened and rigidly attached to the subsea riser equipment 106 these also may be used to transmit forces from the subsea riser system equipment 107 to the suction anchor 103. Such an arrangement is shown in FIG. 6.

As shown for example in FIG. 6 the guide posts 110 may have an additional anchor 116 in addition to a conventional anchor 118 to connect the guide post 110 to the guidebase 108. This may ensure that the guide posts 110 can effectively transmit forces into the wellhead foundation/conductor.

The assembly may comprise an upper fixing device 120 and a lower fixing device 122 in respect of each guide post 110 to rigidly connect the guide post 110 to the subsea riser system equipment 106. These fixing devices 120, 122 may each comprise a donut that pushes against the subsea riser system equipment 106 and retrievable dogs. These fixing devices 120, 122 may ensure that the subsea riser system equipment 106 is fixed vertically to the guide base 108.

ROV torque buckets 124 and worm gears may be used to control and adjust the fixing devices 120, 122.

To install the assembly 100 shown in FIGS. 5 and 6 the suction anchor 103 may be sucked into the sea bed 105. This may be performed with the high pressure wellhead 104 and guide posts 110 attached to the suction anchor 103 or these components may be attached after the suction anchor 103 is installed. The subsea sea riser system equipment 106 may then be landed on the wellhead 104. The subsea riser system equipment 106 is guided onto the wellhead using the guideposts 110. The guideposts 110 are connected to guide wires 111 which extend to the surface. The guide wires extend through the channels 112 of the subsea riser system equipment 106 and are used to guide the guideposts 110 into the channels 112 so as to align the connection portion of the subsea riser system equipment 106 with the wellhead 104.

Once the subsea riser system equipment 106 is mounted on the wellhead the link elements 114 and/or strengthened guide posts 110 may be used to connect the subsea riser system equipment 106 to the top plate 108 of the suction anchor 103.

The link elements 114 once connected between the plate 108 and bottom of the subsea riser system equipment 106 may be put into tension and/or compression. This may be achieved by the link elements 114 being adjustable. This is to ensure that there is a rigid connection between the subsea riser system equipment 106 and the well foundation (i.e. conductor) to permit effective force transmission to the conductor rather than the high pressure wellhead housing 104. This may provide load relief for the wellhead 104.

The invention claimed is:

1. A subsea wellhead assembly, the assembly comprising:
   a conductor;
   a subsea wellhead; and
   subsea riser system equipment mounted on the subsea wellhead,
   wherein the subsea riser system equipment is connected to the conductor such that forces can be transmitted from the subsea riser equipment to the conductor in both tension and compression, and
   wherein the conductor is one of a conventional conductor comprising a conductor housing and a plurality of conductor joints attached thereto, and a device that provides the functions of a conventional conductor.

2. The subsea wellhead assembly as claimed in claim 1, wherein the assembly comprises a connection device that connects the subsea riser system equipment to the conductor.

3. The subsea wellhead assembly as claimed in claim 2, wherein the connection device comprises a connection bracket mounted on the conductor that permits the subsea riser system equipment to be connected to the conductor.

4. The subsea wellhead assembly as claimed in claim 3, wherein the connection bracket is dimensioned and configured to fit to a conductor.

5. The subsea wellhead assembly as claimed in claim 3, wherein when the connection bracket is located around the conductor it is in contact with a wellhead support such that loads from the subsea riser equipment can be spread into the wellhead support.

6. The subsea wellhead assembly as claimed in claim 3, wherein the connection device comprises a connection member, wherein the connection member is connected between the connection bracket and the subsea riser system equipment so that forces can be transmitted from the subsea riser equipment to the conductor.

7. The subsea wellhead assembly as claimed in claim 6, wherein the connection member is a guidepost.

8. The subsea wellhead assembly as claimed in claim 1, wherein the connection between the subsea riser system equipment and the conductor is in compression, or the connection between the subsea riser system equipment and the conductor is in tension.

9. The subsea wellhead assembly as claimed in claim 1, wherein the assembly comprises a preload device for allowing a preload to be exerted on the connection between the subsea riser system equipment and the conductor.

10. The subsea wellhead assembly as claimed in claim 9, wherein the preload device is a tensioner for putting the connection between the subsea riser system equipment and the conductor into tension, or the preload device is a jack for putting the connection between the subsea riser system equipment and the conductor into compression.

11. The subsea wellhead assembly as claimed in claim 10, wherein the preload device is operable using an ROV.

12. The subsea wellhead assembly as claimed in claim 1, wherein the assembly is a free-standing subsea wellhead assembly.

13. The subsea wellhead assembly as claimed in claim 1, wherein the assembly comprises a support structure, wherein the support structure is clamped onto the conductor to increase the effective area of the conductor immersed in the soil.

14. A subsea wellhead assembly comprising:
   a conductor;
   a subsea wellhead; and
   subsea riser system equipment mounted on the subsea wellhead,
   wherein the subsea riser system equipment is connected to the conductor such that forces can be transmitted from the subsea riser equipment to the conductor in both tension and compression,
   wherein the connection device comprises a connection bracket mounted on the conductor that permits the subsea riser system equipment to be connected to the conductor, and
   wherein the connection bracket is a guidebase.

15. A method of installing a subsea wellhead assembly, the method comprising:
   providing a conductor, a subsea wellhead, and subsea riser system equipment mounted to the wellhead,
   wherein the conductor is one of a conventional conductor comprising a conductor housing and a number of conductor joints attached thereto, or a device that provides the functions of a conventional conductor; and
   connecting the subsea riser system equipment to the conductor such that forces can be transmitted from the subsea riser equipment to the conductor in both tension and compression.

16. The method of installing a subsea wellhead assembly according to claim 15, wherein the method comprises connecting the subsea riser system equipment to the conductor such that forces can be transmitted from the subsea riser equipment to the conductor using a connection device.

17. The method of installing a subsea wellhead assembly according to claim 15, wherein the connection device comprises a connection bracket mounted on the conductor which permits the subsea riser system equipment to be connected to the conductor.

18. The method of installing a subsea wellhead assembly according to claim 17, wherein the method comprises retrofitting the connection bracket to an installed conductor, and wherein the method comprises connecting the conductor to the subsea riser system equipment via the retrofit connection bracket.

19. A method of installing a subsea wellhead assembly, the method comprising:
   providing a conductor, a subsea wellhead, and subsea riser system equipment mounted to the wellhead;
   connecting the subsea riser system equipment to the conductor such that forces can be transmitted from the subsea riser equipment to the conductor in both tension and compression,
   wherein the connection device comprises a connection bracket mounted on the conductor which permits the subsea riser system equipment to be connected to the conductor; and
   retrofitting the connection bracket to an installed conductor, and connecting the conductor to the subsea riser system equipment via the retrofit connection bracket, wherein the connection bracket is a guidebase, the guidebase is used to guide the subsea riser system equipment onto the wellhead and then, once the subsea riser system equipment is mounted on the wellhead, and the guidebase is used to connect the subsea riser system equipment to the conductor such that forces can be transmitted from the subsea riser system equipment to the conductor.

20. The method of installing a subsea wellhead assembly according to claim 19, wherein the connection device comprises a preload device, the method further comprising preloading the connection between the subsea riser system equipment and the conductor.

\* \* \* \* \*